United States Patent [19]

King

[11] 4,242,190
[45] Dec. 30, 1980

[54] ROTARY ELECTRODIC TREATER WITH JET ACTION CLEANING

[76] Inventor: Arthur S. King, 8021 Cherokee La., Leawood, Kans. 66206

[21] Appl. No.: 42,774

[22] Filed: May 29, 1979

[51] Int. Cl.³ .......................... C02C 5/12; C02B 1/82; C25B 9/04
[52] U.S. Cl. ................................... 204/212; 204/149; 204/275
[58] Field of Search ............... 204/212, 229, 149, 152, 204/275

[56] References Cited

U.S. PATENT DOCUMENTS 3,546,089  12/1970  Schneider ........................ 204/149 X
3,873,434  3/1975  King ..................................... 204/212

Primary Examiner—Arthur C. Prescott
Attorney, Agent, or Firm—Schmidt, Johnson, Hovey & Williams

[57] ABSTRACT

The treater has one of its electrodes rotating within the treating chamber, and the other electrode is specially configured to not only serve as means for cooperating in the production of the electric field, but also to serve as an inlet nozzle for incoming fluid into the treating chamber. The inlet nozzle of the specially shaped electrode is directed toward the rotating electrode and is located in closely spaced proximity thereto so that the rotating electrode is cleaned by the jet action liquid issuing from the other electrode.

5 Claims, 3 Drawing Figures

ROTARY ELECTRODIC TREATER WITH JET ACTION CLEANING

TECHNICAL FIELD

This invention relates to the treatment of fluids by electrical means and, more particularly, to an arrangement for keeping at least one of the electrodes of such a treater clear of a collecting film that would otherwise impede or inhibit proper electrodic action.

BACKGROUND ART

There is a tendency during electrodic action for a film to build up along the outer surface of at least one of the electrodes of an electric treater, such film inhibiting the electrodic action. Moreover, dipole water molecules, in the case of a liquid containing water, have a tendency to form a layer around the positively charged electrode during treatment, such layer also inhibiting proper electrodic action because it obstructs free access of impurity particles in the liquid to the electrode.

Spinning or rotating the electrode is helpful in minimizing the film and in keeping the dipole water molecule layer from stabilizing and building up excessively, but such rotation in and of itself may not always be sufficient to achieve the desired results.

SUMMARY OF THE PRESENT INVENTION

Accordingly, one object of the present invention is to provide an auxiliary jet action cleaning arrangement in an electric treater utilizing a rotary electrode such that, through the additional jet action, the deleterious buildup of film and dipole molecules can be further minimized.

Pursuant to the foregoing, the present invention is characterized by a nozzle situated along side and in close proximity to the rotating positive electrode within the treating chamber. As the electrode spins, the nozzle directs a jet of incoming liquid to be treated against the spinning surface of the electrode all along the length so as to prevent film buildup and establishment of an inhibiting dipole layer. The nozzle is incorporated into the oppositely charged electrode of the treater.

DETAILED DESCRIPTION

Figures 1, 2, 3:
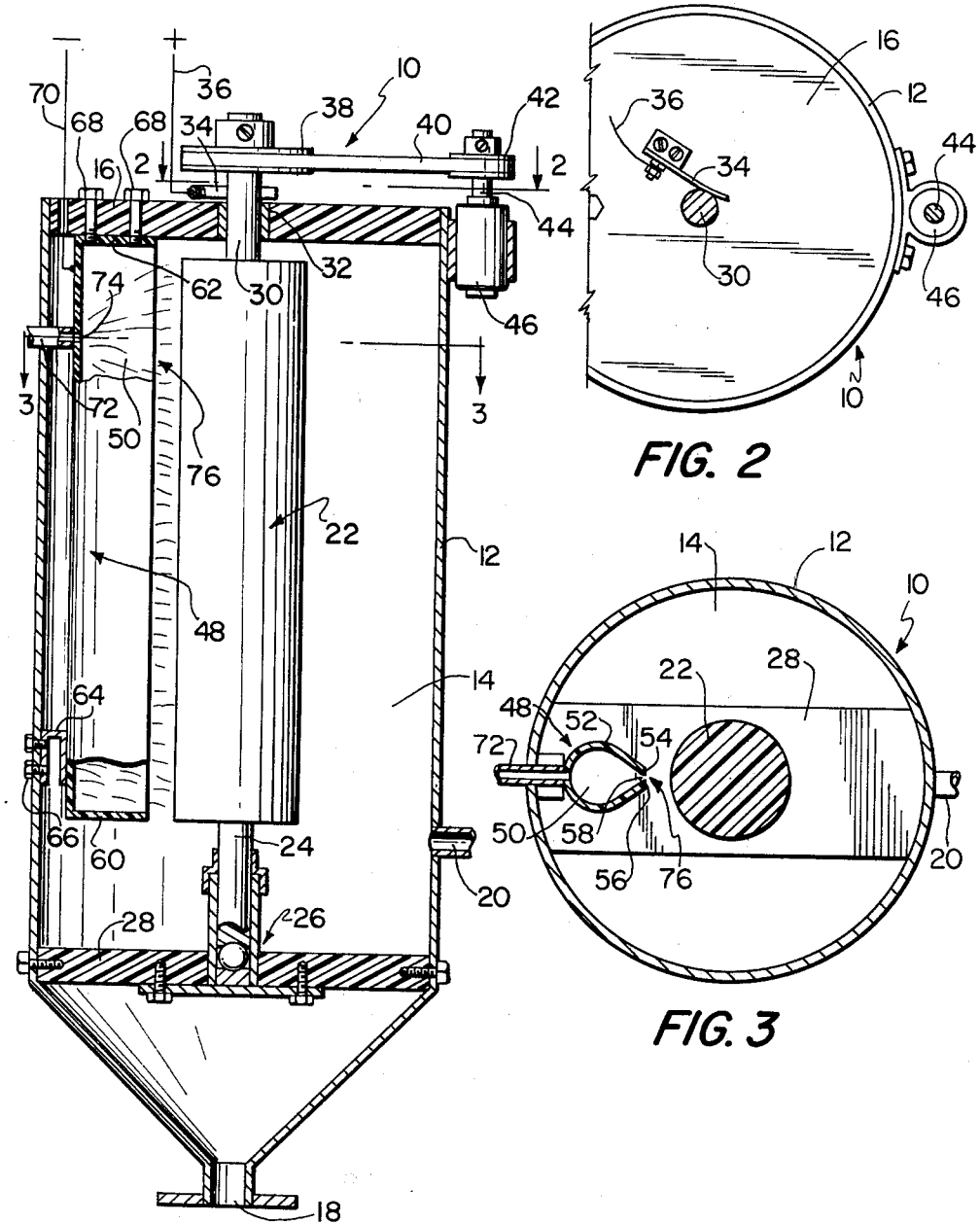
FIG. 1 is a vertical, cross-sectional view of a treater constructed in accordance with the principles of the present invention.
FIG. 2 is a fragmentary, horizontal cross-sectional view of the treater taken substantially along line 2—2 of FIG. 1.
FIG. 3 is a horizontal, cross-sectional view through the treater taken substantially along line 3—3 of FIG. 1.

The treater 10 includes a tank 12 having an internal treating chamber 14, the tank 12 having a cap 16 closing its otherwise open upper end, and having an outlet 18 at its lower end. A sampling outlet 20 may be provided in the side of the tank 12 if desired.

Concentrically disposed within the cylindrical tank 12 is a cylindrical electrode 22 of any suitable conductive material but preferably of carbon. The electrode 22 has a lower reduced diameter shaft 24 received within a bearing assembly 26 which is in turn supported within the chamber 14 by a transverse bar 28, and a second reduced diameter shaft 30 projects from the upper end of the electrode 22 through a bushing 32 in the cap 16.

Thus, the bushing 32 and the bearing assembly 26 adapt the electrode 22 for rotation about the upright, longitudinal axis of the latter. The bushing 32 and the bearing assembly 26 are either constructed of or are otherwise provided with suitable dielectric material so as to electrically insulate the electrode 22 from the tank 12.

The upper shaft 30 projects upwardly beyond the cap 16 for a distance and is contacted by an electrical contact 34 which bears against the shaft 30 during rotation of the electrode 22 so as to maintain electrical continuity between the latter and a lead 36 leading from the contact 34 to a source of electrical potential, the lead 36 preferably being connected to the positive side of such source so as to render the electrode 22 positively charged.

A sheave 38 affixed to the uppermost end of the shaft 30 is entrained by a belt 40 which in turn entrains a second sheave 42 affixed to the output shaft 44 of a suitable motor 46. This arrangement provides driving power for the electrode 22, and the motor 46 may conveniently be mounted directly onto the side of the tank 12 if such is desired.

Positioned generally along side of and coextensive in length with the electrode 22 is a second electrode 48 of special configuration. In this regard, the electrode 48 is hollow, having an elongated, internal cavity 50 extending between the opposite upper and lower ends of the electrode 48. As shown most clearly in FIG. 3, the electrode 48 is of a generally "teardrop" configuration in transverse cross section, having a continuous, arcuate sidewall 52 leading from a first longitudinal edge 54 to a second, terminal longitudinal edge 56 closely adjacent yet spaced from the edge 54 so as to define a longitudinal slit 58 between the edges 54 and 56 along the length of the electrode 48. A bottom wall 60 spans the continuous sidewall 52 along the lower end of the electrode 48 such as to close off the same, while a top wall 62 spans the continuous sidewall 52 at the top end of the electrode 48 to close off the same. An insulated mounting bracket 64 affixed to the sidewall 52 adjacent the lower end of the electrode 48 may be secured to the wall of the tank 12 via fasteners 66 to assist in supporting the electrode 48, and additional fasteners 68 may be used to secure the upper end of the electrode 48 to the cap 16. If desired, the cap 16 may be of dielectric material such that the bushing 32 for the shaft 30 of electrode 22 may be of hard metal and yet the fasteners 68 may likewise be metalic in nature without disrupting the intended electrical continuity of the treater.

Preferably, the sidewall 52 of electrode 48 is formed from a metalic substance and has a lead 70 connected thereto which is in turn connected to the source of electrical potential, preferably to the negative side thereof.

A supply line 72, preferably of dielectric material or otherwise insulated in a suitable manner from the electrode 48, passes through the wall of the tank 12 into communication with an opening 74 in the sidewall 52 of electrode 48. The supply line 72 is connected at its upstream end to a source not shown of liquid to be treated and thus serves as a means for supplying such liquid into the cavity 50 of electrode 48 for subsequent introduction into the treating chamber 14 in the manner which will now be described.

The slit 58 along the length of the electrode 48 is directly opposed to the electrode 22 as well shown in FIG. 3, ad because of the reduced dimensions of the slit 58 relative to the size of the cavity 50, the outlet slit 58 serves as an inlet nozzle, broadly denoted by the numeral 76, for the incoming liquid. Such nozzle 76 is directed toward the electrode 22, and because of its close proximity to such electrode 22, the nozzle 76 causes the incoming liquid to impinge against the electrode 22 in a jet action. Consequently, the incoming liquid is not only subjected to the desired electrical action achieved by the opposite polarity of the electrodes 22 and 48, but also serves the function of cleaning the surface of the electrode 22 as the latter is rotated by the motor 46. Consequently, any film or residue that might tend to collect on the surface of the electrode 22 is immediately removed therefrom by the jet action of nozzle 76 and, likewise any dipolar layer tending to form around the surface of the electrode 22 and inhibit the migration of impurity particles to the latter is discouraged from forming.

In the preferred mode of operation, the tank 12 is normally completely filled with liquid, and the outlet 18 is regulated to maintain such liquid level in coordination with the incoming liquid as supplied by the nozzle 76. It is to be understood, however, that the operation could be handled on a "batch" basis as opposed to a continuous flow basis. It should also be noted that the operation as hereinabove described could be carried out without there being a body of liquid in the tank 12, the desired electrical action being imparted to the incoming liquid through nozzle 76 because of the electrical continuity established by the steam being in contact with both electrodes.

I claim:

1. A device for electrically treating liquids comprising:
   a treating chamber;
   an electrically conductive inlet nozzle within the chamber for supplying liquid thereto for treatment;
   an electrode within said chamber,
   said electrode and said nozzle being connected across a source of electrical potential whereby to oppositely charge the same, said nozzle being directed toward said electrode and positioned in relatively close proximity thereto so as to force the incoming liquid against said electrode in a jet action; and
   means for effecting relative rotation between the nozzle and said electrode so as to progressively expose different portions of the surface of said electrode to the jet action of said nozzle.

2. A device as claimed in claim 1, wherein said means for effecting relative rotation is coupled with said electrode for rotating the same.

3. A device for electrically treating liquids comprising:
   a treating chamber;
   a pair of electrodes in said chamber connected across a source of electrical potential so as to oppositely charge said eletrodes;
   an inlet nozzle for supplying liquid to said chamber for treatment,
   said nozzle being directed toward one of said electrodes and positioned in relatively close proximity thereto so as to force the incoming liquid aginst said one electrode in a jet action; and
   means for effecting relative rotation between the nozzle and said one electrode so as to progressively expose different portions of the surface of said one electrode to the jet action of said nozzle,
   the other of said electrodes having a cavity therein adapted to receive incoming liquid prior to the nozzle, said cavity having an outlet, said outlet comprising said nozzle.

4. A device as claimed in claim 3, wherein said outlet is coextensive in length with said one electrode.

5. A device as claimed in claim 4, wherein said other electrode is held against rotation, said means for effecting relative rotation being coupled with said one electrode for rotating the same.

* * * * *